United States Patent Office 3,326,829
Patented June 20, 1967

3,326,829
COPOLYMER OF CHLORINATED HYDRO-
CARBON AND VINYL ESTER
Eugene A. Duchesneau and Milton W. Kline, Leominster, Mass., and Samuel Loshaek, Stamford, Conn., assignors to The Borden Company, New York, N.Y., a corporation of New Jersey
No Drawing. Filed June 14, 1963, Ser. No. 287,794
11 Claims. (Cl. 260—27)

This invention relates to copolymers of chlorinated paraffin or the like with vinyl chloride or other ethenoid monomer and to the process of making such products.

The copolymers are particularly useful as extenders for the base resin in a sound record composition and a hot melt adhesive and will be illustrated in connection with such uses.

Chlorinated hydrocarbons have been employed heretofore as plasticizers for the vinyl resins. In such use the chlorinated hydrocarbon has been compounded with prepolymerized polyvinyl chloride. Because of the softening effect of plasticizers on the finished resin composition, such plasticizers in general decrease the strength of the film or sheet so compounded. Also the plasticizer retains solubility in solvents that are usual therefor.

The present invention provides a process and composition in which the chlorinated paraffin loses its identity as shown by insolubility in chloroform or like liquid solvent. The effect of the plasticizer in improving flowability or flexibility is preserved but the flexural strength of a polyvinyl chloride resin compounded therewith is also preserved and in some instances actually increased moderately. In addition, the invention provides an economical copolymer composition in which the relatively inexpensive chlorinated hydrocarbons replace a substantial proportion of the monomers with which they are copolymerized by our process.

Briefly stated, the invention comprises the herein described process of and product resulting from copolymerizing the ethenoid monomer and the chlorinated hydrocarbon. The invention comprises also the sound record or adhesive compositions including the product of the copolymerization.

The process of the invention includes mixing the chlorinated hydrocarbon, the selected ethenoid compound in monomeric form, and also an initiator of polymerization of ethenoid compounds and maintaining the reactants and initiator in contact with each other at an elevated temperature of reaction until the monomer added has been essentially completely reacted. This condition or the end point of the reaction may be determined by noting when the vapor pressure in the reacting system ceases to fall at a substantial rate. The heating to cause reaction is then discontinued and the product cooled.

The chlorinated hydrocarbon to be used is determined by the particular set of properties desired in the finished product. It may be saturated or unsaturated. Hydrocarbon meeting the requirements for materials to be chlorinated for the present use are such commercial products as paraffin, microcrystalline, or slack wax and individual or mixed alkanes or olefins, as in the range 18–35 carbon atoms and suitably 16–25 to the molecule. These are chlorinated in any usual manner to the extent of about 20%–80% of chlorine on the weight of the finished chlorinated product. Commercial materials to be used in our treatment with the ethenoid monomer include those known as "Chlorinated Hydrocarbon HRS-1595" (chlorinated paraffin of Cl content about 57%–60%); "Chlorinated Hydrocarbon C" and also grades "S" and "T" thereof, of Cl content 50%, 40%, and 52%, respectively; "Chlorowax 40" and grades "LV," "50" and "70" thereof, of Cl content 40%, 40%, 50% and 70%, respectively; and the dimer, trimer, tetramer or other liquid polymer of propylene.

The ethenoid monomer used is ordinarily vinyl chloride. Other ethenoid monomers, e.g., vinylidene chloride, vinyl acetate, $C_1$–$C_8$ alkyl acrylates such as, methyl, ethyl, butyl, and 2 ethylhexyl acrylates, may be used for special properties of the products, in combination with vinyl chloride monomer, as in the proportion 60–95 parts of the chloride for 100 parts of total combination.

The initiator is any one that initiates polymerization or copolymerization of ethenoid compounds, particularly in vinyl chloride polymerization. We have used in our work principally lauroyl peroxide and azobisisobutyronitrile. Other initiators that may be used are the benzene-soluble organic peroxides, e.g., benzoyl, 2,4-dichlorobenzoyl, and caprylyl peroxides; hydrogen peroxide; and the per salts such as sodium or other alkali metal persulfate or perbenzoate.

Proportions of the various materials that are permissible and others that are recommended for commercial use are shown in the table below.

| Component | Parts by Weight | |
|---|---|---|
| | Permissible | Preferred |
| Chlorine content of the chlorinated hydrocarbon used, percent | 20–80 | 35–65 |
| Parts of ethenoid monomer for 100 of chlorinated hydrocarbon | 5–300 | 5–70 |
| Initiator, percent of chlorinated hydrocarbon | 0.1–5 | 0.3–3 |

In general the hardness or brittleness of the product of the action of the chlorinated hydrocarbon with the ethenoid monomer in contact with the initiator increases with the proportion of chlorine in the chlorinated hydrocarbon used and with the proportion of the vinyl ester to the chlorinated hydrocarbon, these observations being based upon the use of vinyl chloride as the monomer selected.

As to conditions of operations, we use any of the standard techniques for polymerization or copolymerization of vinyl chloride, that is solution, suspension or emulsion polymerization, with an initiator or initiator system which is conventional for the particular type of polymerization technique that is chosen. The invention is further illustrated by description in connection with the following specific examples, proportions here and elsewhere herein being expressed as parts by weight unless specifically stated to the contrary.

*Examples 1–6*

Six different products were made as follows:
The chlorinated hydrocarbon was melted and charged into each of six bottle reactors, the contents of the bottles were then cooled and the catalyst (initiator) introduced. Finally the monomeric vinyl chloride was added and the bottles capped, then agitated slowly by a bottle shaking machine, and maintained at approximately 135° F. for 18 hours. Generally, polymerization is accomplished while maintaining a temperature range of about 100°–180° F. At that time any unreacted residual monomer (vinyl chloride) was bled off through a small hole made in the bottle cap.

The residue in the bottles were then cooled to room temperature and the contents removed from the bottle and examined. The compositions and the properties of the products are shown in the table below.

| Ingredients | Examples No. | | | | | |
|---|---|---|---|---|---|---|
| | 1 | 2 | 3 | 4 | 5 | 6 |
| Chlorinated Hydrocarbon HRS-1595, 57% Cl, amber solid, g | 30 | 27 | | | | |
| Chlorinated Hydrocarbon C, 40% Cl, black viscous liquid, g | | | 30 | | | |
| Chlorinated Hydrocarbon S, 40% Cl, yellow oil, g | | | | 30 | | |
| Chlorinated Hydrocarbon T, 52% Cl, amber oil, g | | | | | 30 | |
| Chlorowax 40, black oil, g | | | | | | 30 |
| Lauroyl Peroxide, g | 0.2 | 0.2 | 0.2 | 0.2 | | |
| Vazo (azobisisobutyronitrile), g | | | | | 0.2 | 0.2 |
| Vinyl Chloride Monomer, g | 30 | 27 | 30 | 50 | 30 | 40 |
| Yield of Product, g | 34 | 31 | 34 | 48 | 54 | 62 |
| Percent of Orig. VCl bound to chlorinated Hydrocarbon | 13.3 | 14.8 | 13.3 | 36 | 80 | 80 |

CHARACTERISTICS OF PRODUCTS

| | | | | | | |
|---|---|---|---|---|---|---|
| Physical Appearance | Rubbery, some tack | | Tacky wax | Soft, slight rubbery, wax | Brittle wax | Pliable solid |
| Durometer A (Hardness) [1] | 46 | 42 | 43 | 58 | 59 | |
| Tensile Strength, p.s.i. [2] | 105 | 147 | 53 | 470 | 108 | |
| Elongation at Break, Percent [2] | 81 | 112 | 19 | 144 | 19 | |

[1] Durometer A—This is a measure of the hardness of the solid, the higher the reading the harder the solid. (Cf. ASTM D1706-59T). It is important to note that even when liquid chlorinated waxes were used, the resulting products were solid materials, capable of undergoing this hardness measurement.
[2] Both of these measurements also show the distinct change in physical properties of the wax as a result of the polymerization described. The tensile strength and percent elongation of the original waxes (at room temperature) could not be measured, because of being too weak.

The products of the polymerization preparation were not soluble in cold or hot chloroform whereas the starting chlorinated hydrocarbon was soluble in either cold or hot chloroform.

It will be observed that the physical properties of all of the products in which the vinyl chloride was combined with the chlorinated hydrocarbon differed from those of the starting material. Thus the bonding of 13.3% of 30 grams of vinyl chloride or 4 grams in 30 of the chlorinated hydrocarbon converted the black viscous liquid of Example 3, for instance, to a desirably soft tacky wax. A somewhat smaller percentage of vinyl chloride in proportion to the wax used converted the amber solid of preparation 1 to a rubbery product with some tack.

*Example 7*

In this example 12 polymerizations were effected, the charges being as follows: Chlorinated paraffin wax (52% Cl), an amber oil, 40 grams; vinyl chloride monomer 40 grams; azobisisobutyronitrile initiator 0.28 gram. These materials were polymerized, in the capped and shaken pressure bottle as above at 135° F. for 24 hours. For many of the bottles there was found at the end only a little pressure (due to no substantial amount of remaining vinyl chloride monomer). In each instance the "Final product" was rubbery, waxy and of a light amber color. The average yield per bottle was 69 grams, this corresponding to a retention in the wax of 73% of the vinyl chloride originally used. The physical properties were Durometer A 62; tensile strength 223 p.s.i.; percent elongation at break 75.

*Example 8*

This example illustrates the use of the copolymer of chlorinated hydrocarbon and the vinyl chloride in making a sound record, i.e., as a modifier for the base resin.

The ingredients in the amounts stated were milled together on a two-roll mill for 5 minutes at 270° F. and the product shaped and tested with the results shown.

| | Parts for Various Preparations | | | | |
|---|---|---|---|---|---|
| | a | b | c | d | e |
| Ingredients: | | | | | |
| VC-113R (copolymer of 85% vinyl chloride and 15% vinyl acetate used in record compositions) | 98.5 | 93.5 | 88.5 | 83.5 | 83.5 |
| "Final product" of Example 7 | | 5.0 | 10.0 | 15.0 | |
| DS-207 (dibasic lead stearate, stabilizer used in record compositions) | 1.0 | 1.0 | 1.0 | 1.0 | 1.0 |
| Carbon Black | 0.5 | 0.5 | 0.5 | 0.5 | 0.5 |
| Vinex 110 (an asphaltic hydrocarbon extender resin, used to lower cost of record compositions and improve melt flow properties) | | | | | 15.0 |
| Physical Properties: | | | | | |
| Flexural Strength, p.s.i.: | | | | | |
| 1 day [1] | 12,200 | 12,500 | 12,400 | 13,200 | 9,900 |
| 21 days | 12,100 | 12,500 | 12,600 | 11,100 | 9,800 |
| Angle at Break, deg.: | | | | | |
| 1 day [1] | 90+ | 90+ | 90+ | 42 | 32 |
| 21 days | 90+ | 90+ | 90+ | 32 | 27 |
| Flow Test at 300° F., [2] diam. in cm | 6.1 | 6.2 | 6.4 | 6.7 | 6.4 |

[1] As measured on a specimen 6″ x 1″ x 0.02″ on Tinius Olsen Stiffness Tester.
[2] As measured on a 1.0 gm. sample of the composition which is pressed at 300° F. 200 p.s.i., for 15 seconds. The diameter of the resulting disc is a measure of the flow properties of the composition.
The plus signs (+) mean: did not break at the angle stated.

It is to be noted from the above table that the chlorinated-wax vinyl chloride copolymer can be used to extend the normal vinyl chloride-acetate resin used in phonograph record compositions. As can be seen levels lower than 15% do not appreciably affect the flexural strength or the breaking angle of the compositions. (These physical properties are, of course, of great importance to a phonograph record.) In addition, introduction of the product of Example 7 improves the melt flow properties of the composition, as shown by the Flow Test.

Finally, a comparison of composition b, c, and d with e shows the superiority of the product of this invention as compared to a commonly used extender resin for phonograph record compositions.

*Example 9*

The procedure of Example 1 is followed except that the composition used was a mixture of 30 parts of Chlorinated Hydrocarbon T (52% Cl), 30 parts of vinyl acetate and 1.0 part of benzoyl peroxide and the mixture was polymerized at 150° F. for 18 hours giving a viscous amber liquid as the product.

*Example 10*

The procedure of Example 1 was followed except that the composition used was a mixture of 30 parts of Chlorinated Hydrocarbon T (52% Cl), 40 parts of vinylidene chloride and 0.2 part of azobisisobutyronitrile. The resulting product (67 parts, 95% yield) was a yellow solid, insoluble in tetrahydrofuran, chloroform or xylene.

*Example 11*

The final product of Example 2, that is, the copolymer of vinyl chloride and the chlorinated hydrocarbon, was used as a hot melt adhesive as follows: Said product was melted and applied to cardboard. Two sheets of the cardboard with the coating of adhesive between the meeting surfaces were pressed together and heat sealed. After cooling, the cardboard rather than the hot melt adhesive failed when the plied sheets were pulled apart.

In a modification of this example there are admixed, with 100 parts of said copolymer, about 15 parts of hydrogenated rosin as tackifying agent, to increase the adhesiveness. The whole is thoroughly blended by warming to a softened mass and stirring until substantially uniform. It is then used as the hot melt adhesive with cardboard as described above. In a variation of this embodiment, the proportion of the tackifying agent may be varied as within the range 5%–50% of the weight of the said copolymer.

In another variation there is admixed a plasticizer for the said copolymer, namely, di-2-ethylhexyl phthalate, the whole being warmed and mixed as described in the case of the composition including the tackifying agent. The proportions of the plasticizer may be varied as from 5% to 100% of the weight of said copolymer. Also other plasticizers that are conventional for polyvinyl chloride may be used in place of said phthalate, as, for example, dibutyl or didodecyl phthalate, sebacate or adipate; tricresyl phosphate; epoxidized soybean or linseed oil; or a polymer of a plasticizing comonomer such as a graft polymer of 2-ethylhexyl acrylate with vinyl chloride or vinylidene chloride.

In a further modification, both the tackifying agent and the plasticizer, each of kind and in the proportion stated may be admixed with the copolymer.

It will be understood that it is intended to cover all changes and modifications of the examples of the invention herein chosen for the purpose of illustration which do not constitute departures from the spirit and scope of the invention.

We claim:

1. The copolymer of a chlorinated aliphatic hydrocarbon wax containing 18–35 carbon atoms to the molecule and of chlorine content 20%–80%, with an ethenoid monomer selected from the group consisting of vinyl chloride and mixtures of vinyl chloride with a comonomer selected from the group consisting of vinylidene chloride and $C_1$–$C_8$ alkyl acrylates, said mixtures having about 60–95 parts of said chloride for 100 parts total of the mixtures and the proportion of said ethenoid monomer used being about 5–300 parts by weight for 100 parts total of said chlorinated hydrocarbon.

2. The copolymer of chlorinated paraffin wax of chlorine content 20%–80% with vinyl chloride in the proportion of about 5–300 parts of the vinyl chloride to 100 parts of the chlorinated paraffin wax.

3. The copolymer of claim 1, the said chlorinated hydrocarbon being chlorinated paraffin.

4. In making a copolymer, the process which comprises forming a mixture of a chlorinated aliphatic hydrocarbon wax containing 18–35 carbon atoms to the molecule and of chlorine content 20%–80%, with an ethenoid monomer selected from the group consisting of vinyl chloride and mixtures of vinyl chloride with a comonomer selected from the group consisting of vinylidene chloride and $C_1$–$C_8$ alkyl acrylates, said mixtures having about 60–95 parts of said chloride for 100 parts total of the mixtures and the proportion of said ethenoid monomer used being about 5–300 parts by weight for 100 parts total of said chlorinated hydrocarbon, with an initiator of ethenoid bond polymerization in proportion at least sufficient to initiate polymerization and warming said mixture until the vapor pressure thereof practically ceases to fall.

5. The process of claim 4, said monomer being vinyl chloride and the warming being effected at a temperature of about 100° to 180° F. and under pressure.

6. The process of claim 5, the initiator being lauroyl peroxide.

7. In a sound record having a copolymer of vinyl chloride and vinyl acetate as the base resin, the improvement comprising the combination of said resin with the copolymer of claim 1 dispersed as a modifier in the base resin in the proportion of 5.35–18 parts of the copolymer to 100 parts of said resin.

8. In a sound record having a copolymer of vinyl chloride and vinyl acetate as the base resin, the improvement comprising the combination of (1) the base resin with (2) the copolymer of chlorinated paraffin wax of chlorine content 20%–80% with vinyl chloride in proportion of about 5–300 parts of vinyl chloride for 100 parts of said wax, dispersed as a modifier in said resin in the proportion of 5.35–18 parts for 100 parts of said resin.

9. A hot melt adhesive comprising the copolymer of claim 1 and admixed hydrogenated rosin as tackifying agent in the proportion of about 5 to 50 parts for 100 parts of said copolymer.

10. A hot melt adhesive comprising approximately 100 parts of the copolymer of a chlorinated hydrocarbon containing 18–35 carbon atoms to the molecule and of chlorine content 20%–80%, with vinyl chloride in the proportion of about 5–300 parts by weight of vinyl chloride for 100 parts of said chlorinated hydrocarbon and hydrogenated rosin admixed as a tackifying agent in the proportion of about 5–50 parts for 100 parts of said copolymer.

11. A hot melt adhesive comprising approximately 100 parts of the copolymer of a chlorinated hydrocarbon containing 18–35 carbon atoms to the molecule and of chlorine content 20%–80%, with vinyl chloride in the proportion of about 5–300 parts by weight of vinyl chloride for 100 parts of said chlorinated hydrocarbon and an admixed substantially non-volatile liquid plasticizer for said copolymer.

References Cited

UNITED STATES PATENTS

| | | |
|---|---|---|
| 2,636,869 | 4/1953 | Tartas. |
| 2,789,096 | 4/1957 | Bruno et al. _____ 260—27 |
| 3,117,100 | 1/1964 | Cox et al. _____ 260—27 |
| 3,207,721 | 9/1965 | Safford _____ 260—87.5 |

MORRIS LIEBMAN, *Primary Examiner.*

A. LIEBERMAN, *Assistant Examiner.*